Sept. 3, 1935.  E. S. CORNELL, JR  2,013,087
AIR MOTOR
Filed Sept. 11, 1933  2 Sheets-Sheet 1
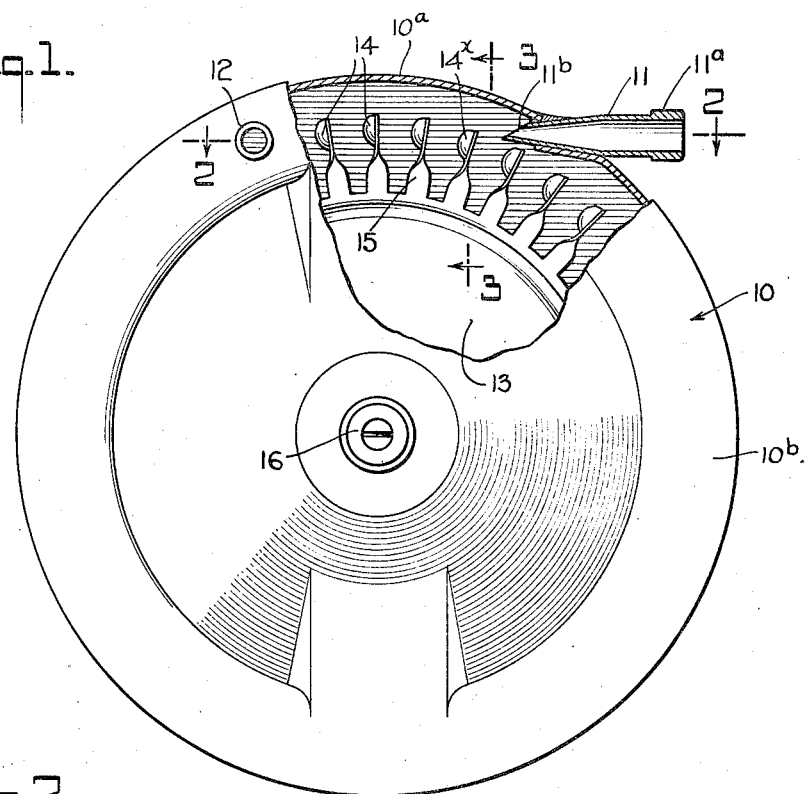
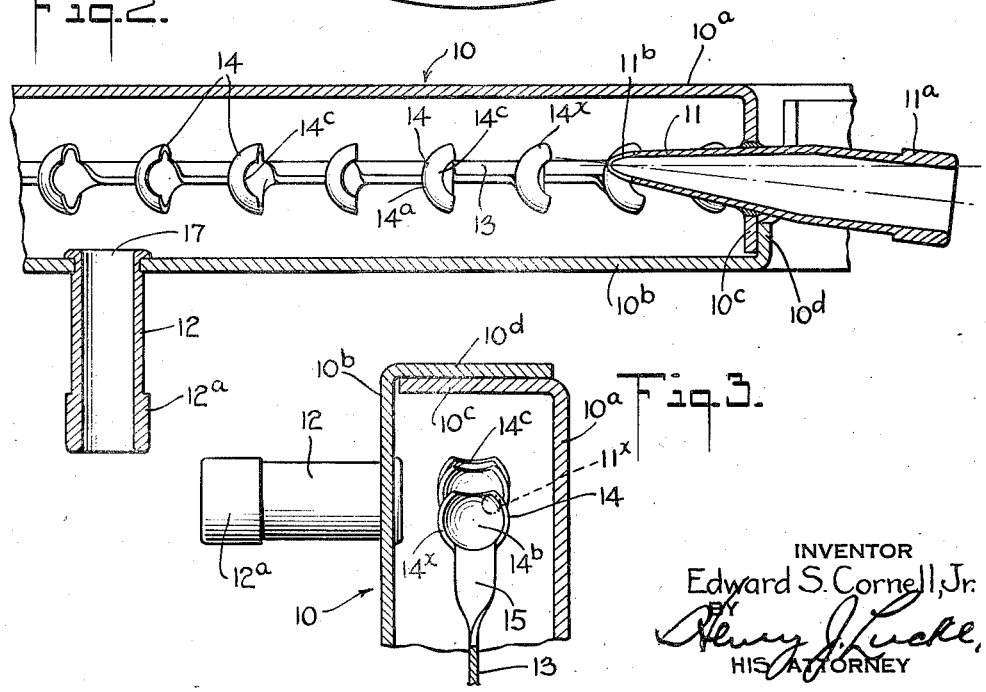
INVENTOR
Edward S. Cornell, Jr.

Sept. 3, 1935.　　　E. S. CORNELL, JR　　　2,013,087
AIR MOTOR
Filed Sept. 11, 1933　　　2 Sheets-Sheet 2
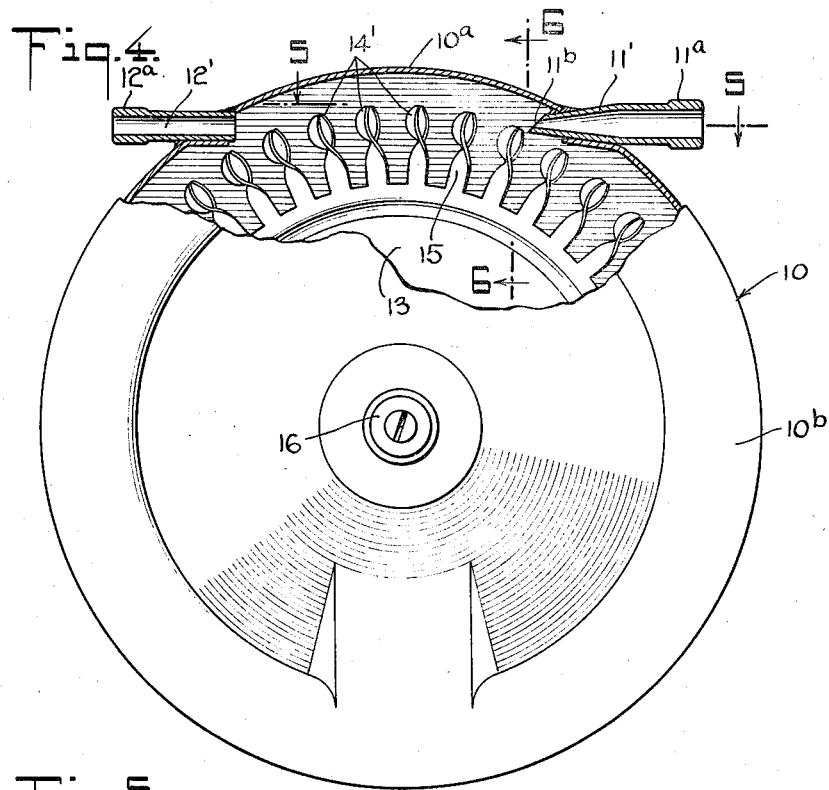
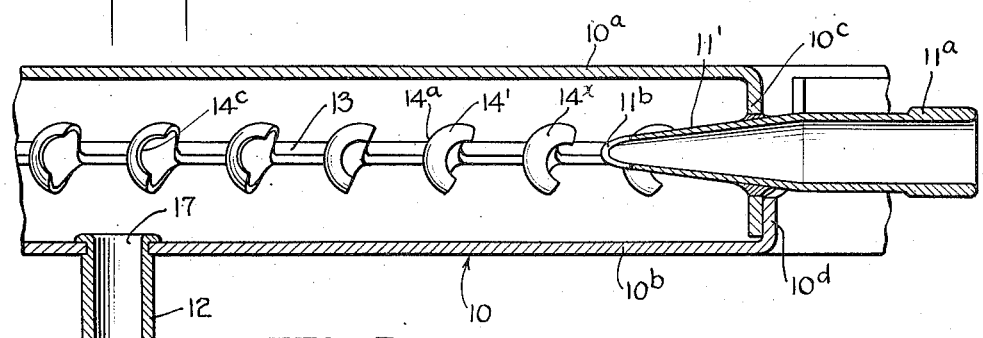
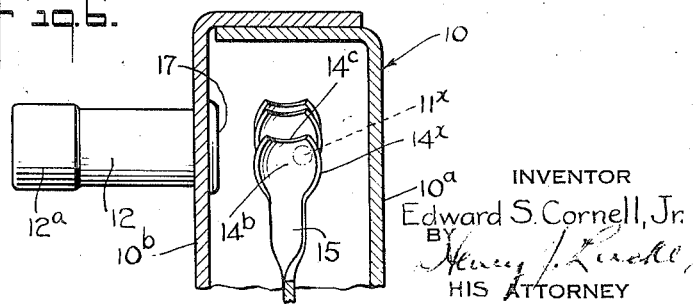
INVENTOR
Edward S. Cornell, Jr.
BY
HIS ATTORNEY Patented Sept. 3, 1935

2,013,087

UNITED STATES PATENT OFFICE 2,013,087

AIR MOTOR

Edward S. Cornell, Jr., Larchmont, N. Y.

Application September 11, 1933, Serial No. 689,035

4 Claims. (Cl. 253—50)

My invention relates to air motors.

More particularly, my invention relates to structural features of an air motor applicable for efficient operation over wide ranges of differential pressures, inclusive of sub-atmospheric pressure differentials and also of super-atmospheric pressure diffentials.

A feature of the invention is the provision of means for substantial elimination of whistling or other tonal and/or noise effects usually encountered in the operation of air motors employing a rotor having uniformly constructed and uniformly spaced buckets or other elements actuated by the flow of air under differential pressure, super-atmospheric or sub-atmospheric, to effect rotation.

In general, the various embodiments of my invention possess the high efficiency of operation, by reason of the structural relationship of the intake and discharge means relating to the air actuated elements of the rotor under pressure differential, whether sub-atmospheric or super-atmospheric.

I contemplate the employment of an air motor under super-atmospheric pressure embodying the present invention in conjunction with a heating and/or cooling radiator unit for effecting heat exchange relation therewith for optional heating and cooling purposes, such as the heating of a room or other enclosure of a building, the air discharged through the outlet of the motor serving to circulate and/or interchange the air of such room, enclosure, etc. Coordinated with such purpose, the compressed air supplied to the motor may be conditioned with respect to moisture and other content. Desirably, with such form of my invention, the employment of oil as a lubricant for the moving parts of the motor and of the appurtenant operated parts, is avoided; in particular, the preferred forms of the present invention, are operated oillessly, thereby preserving the predetermined conditioned status of the air discharged from the motor. In such form of my invention, a fan or equivalent driven by the motor serves to project the air, inclusive of the conditioned air discharged by the motor, in thermal exchange relation to the heating or cooling unit.

In my co-pending application, Serial No. 623,697, entitled Air motor, filed July 21st, 1933, maturing as U. S. Patent #1,926,528, granted September 12th, 1933, I have disclosed and claimed a general embodiment of a circular rotor provided at its periphery with a series of uniformly formed and uniformly spaced buckets or like air actuated rotor elements, the median plane of each bucket being substantially normal to the plane of the rotor, combined with an intake nozzle having a convergently tapering opening within the motor casing, the discharge opening being further cut away on a side opposite to the side of approach of the buckets, for the purpose of eliminating whistling effect, coordinated with the apices of each element being cut away to dually afford close positioning of the nozzle relative to the air actuated rotor elements as the same approach the nozzle, and also as additional means for eliminating whistling. In such arrangement, the axis of the intake nozzle is substantially normal to the medial plane of each bucket as it attains a position substantially midway between the intake nozzle and the discharge opening of the motor, the discharge opening being located from the intake nozzle at an arcuate spacing greater than the spacing between successive buckets or other air actuated rotor elements and less than one hundred and eighty arcuate degrees.

Pursuant to the present invention, assuming the buckets or other air actuated rotor elements to have their median faces substantially normal to the median plane of the rotor, increased efficiency of actuation and reduction of counteracting air flow accompanied by whistling and/or other disturbances is had by disposing the axis of the intake nozzle or other means at an angle slightly less than normal to the median plane of each bucket or rotor element when in position substantially midway between the intake nozzle and the discharge opening of the motor.

Similarly, increased efficiency of actuation and increased reduction of counteracting air flow accompanied by whistling and/or other disturbances is effected by positioning the respective buckets or other air actuated elements to have their median planes at an angle other than normal to the plane of the rotor and to dispose the axis of the intake nozzle or other means substantially parallel to the plane of the rotor.

In each of the above stated two types of intake and bucket or rotor element arrangements, advantages are gained by conjoint co-operation therewith of the following one or more additional structural features, to wit, by cutting away the intake nozzle within the rotor casing on a side remote from the path of travel of the buckets or other air actuated elements; providing the buckets or other air actuated rotor elements with convex leading faces to effect decrease of resistance against forward travel; providing concave trailing faces for the buckets or other air-actuated elements to increase the resultant force imparted by the differential air flow; providing the apices of the buckets or other air actuated elements cut away to afford clearances thereat for positioning the rotor as an entirety more closely to the intake nozzle or other means without substantial increase of disturbance of air flow and whistling; and such additional structural features as will more fully appear.

Further features and objects of the invention will be more fully understood from the following detail description and the accompanying drawings, in which Fig. 1 is a side elevation, partly cut away, of one preferred form of my invention, illustrating the type of normally arranged buckets relative to the median plane of the rotor and air intake disposed at an angle other than normal to the median plane of the rotor. Fig. 2 is a sectional elevation on line 2—2 of Fig. 1, on an enlarged scale. Fig. 3 is a detail sectional elevation on line 3—3 of Fig. 1, on an enlarged scale.

Fig. 4 is a side elevation of another embodiment of my invention, illustrating the type of arrangement of the buckets or other air actuated elements positioned at an angle other than normal to the median plane of the rotor and the intake nozzle positioned to have its axis substantially normal to the median plane of the rotor. Fig. 5 is a sectional elevation, on an enlarged scale, on line 5—5 of Fig. 4. Fig. 6 is a detail sectional view on line 6—6 of Fig. 4, on an enlarged scale. Figs. 5 and 6 show the discharge part communicating laterally with the region of greatest influence of the air flow, whereas Fig. 4 shows the discharge part in alignment with the air inlet.

Referring to the type of air motor illustrated in Figs. 1, 2 and 3, the casing 10 may be of any suitable configuration and material; essentially the casing 10 is imperforate except for the intake and discharge means. The intake is shown in the form of a conical nozzle 11 and the discharge in the form of a cylindrical tube 12. It is convenient to form the casing 10 of a dished member 10a and a complementary member 10b, the latter in the form of a cover, the complementary flanges 10c, 10d, being lodged in position by frictional fit.

The rotor 13 may be of any suitable form; the rotor conveniently has the general configuration of a disc, as shown. The air actuated elements 14 are of any suitable construction; as shown, each air actuated element is of general bucket formation having a convex leading face 14a and a concave trailing face 14b.

Conveniently, the rotor 13 and thereto attached buckets are formed of integral material, had by dieing the buckets and their supporting strips 15 about the periphery of the body of the rotor 13 and turning the respective buckets 14 about a suitable angle to properly position the respective buckets 14 relative to the plane of the rotor 13. The position of the buckets 14 in the type of rotor illustrated in Figs. 1, 2 and 3 is that the median plane of the trailing face of each bucket is substantially normal to the plane of the rotor. Also, as illustrated in Figs. 1, 2 and 3, and as preferred for many characters of use, the buckets 14 or other air actuated rotor elements are disposed substantially uniformly about the periphery of the rotor 13.

The rotor 13 is mounted by any suitable means, indicated generally at 16. Preferably, the rotor is mounted in oilless bearing means, one form of which is shown in my aforesaid co-pending application Serial No. 623,697, maturing as U. S. Patent #1,926,528, granted September 12th, 1933.

Pursuant to the present invention, the type of motor indicated in Figs. 1, 2 and 3, i. e., having normally positioned buckets, the inlet means is disposed to position the axis of its opening within the motor casing at an angle slightly less than normal to the plane of the rotor. As indicated in Fig. 2, the angle of the axis of the inlet nozzle 11 is approximately 85 arcuate degrees relative to the plane of the rotor 13.

Also, as is illustrated in Figs. 1, 2 and 3, the apex 14c of each bucket or other air actuated rotor element is cut away, in the instance illustrated imparting a configuration at the top of each bucket less than a full circle and providing a flange 14c at the top of each trailing face to complete the cup-like formation of the trailing face. Such cut-away or reduced construction enables the rotor as an entirety to be rotatively mounted to locate the apex of each bucket as it approaches and passes the inlet closely adjacent the inlet.

The port 17 of the discharge 12 of the motor may be located at any suitable position relative to the path of travel of the buckets 14 and the axis of the inlet means 11. As shown in Figs. 1, 2 and 3, the discharge port 17 is located in the cover plate 10b thereby disposing the discharge tube 12 to have its axis extending laterally relative to the plane of the rotor 13. It is advantageous also to arrange discharge port to have its axis extend substantially perpendicular to the plane of the rotor, see Fig. 3, and as in my aforesaid U. S. Patent #1,926,528.

In general, it is advantageous to locate the discharge port 17 to communicate within the motor casing within the region of greatest influence of the flow of the air induced by the differential pressure upon the rotor elements. The discharge port 17 is positioned relative to the inlet means 11 at a spacing greater than the spacing between successive rotor elements and less than one hundred and eighty arcuate degrees. The nozzle or other inlet means 11 may be fixed relative to the motor casing or may be adjustably positioned as is generally indicated in Fig. 4 of my aforesaid Patent #1,926,528.

For super-atmospheric differential pressure drive of the motor, the pipe or other conduit conveying the compressed air is attached to the end 11a of the nozzle or other inlet means 11. For sub-atmospheric differential pressure drive of the motor, the pipe or other conduit conveying the sub-atmospheric compressed air is attached to the end 12a of the discharge nipple 12. In either form of actuation, it is advantageous to provide the inner orifice 11b of the intake 11 of cut away formation, the same being disposed relative to the axis of the inlet opposite the path of movement of the buckets 14.

The dotted outline 11x, see Fig. 3, is a graphic projection of the general contour of the part of the inlet nozzle 11 upon the indicated particular bucket 14, see also Figs. 1 and 2.

The construction shown in Figs. 4, 5 and 6 embodies the general principles of the construction shown in Figs. 1, 2 and 3, including common elements; like parts are designated by like reference characters. In the construction shown in Figs. 4, 5 and 6, each rotor element, specifically of bucket formation, and having a convex leading face and a concave trailing face, the median plane of its trailing face being disposed at an angle other than normal to the plane of the rotor. As indicated in Fig. 5, the median plane of each rotor element 14' is approximately eightyfive angular degrees to the plane of the rotor, the rotor elements being substantially uniformly related to the plane of the rotor, as well as substantially uniformly distributed circumferentially relative to the rotor, similarly as in the embodiment shown in Figs. 1, 2, and 3.

In the embodiment shown in Figs. 4, 5 and 6, the inlet means, specifically a nozzle, is disposed to position its axis substantially parallel to the plane of the rotor.

In Fig. 4, the discharge means 12', in the form of a tube or nipple, is disposed to have its axis substantially parallel to and in certain instances in substantial alignment with the axis of the inlet means.

In the several forms of my invention, the cross-sectional area of the discharge means is substantially equal to the cross-sectional area of the inlet means.

From the above, it appears that my invention provides for an air motor comprising a casing having an inner substantially cylindrical contour, a rotor within the casing, the rotor comprising a plurality of radially extending, substantially uniformly circumferentially distributed elements, specifically of general bucket formation, the rotor elements having their peripheral edges spaced at all times from and substantially uniformly for all rotated positions relative to the substantially cylindrical inner face of the casing, the casing being provided with a nozzle or other inlet means and also with discharge means, the cross-sectional area of the discharge means being substantially equal to that of the inlet means, the discharge means communicating within the casing adjacent to the periphery of its inner substantially cylindrical contour, the discharge means being spaced from the inlet means less than one hundred and eighty angular degrees and greater than that of two immediate rotor elements.

The casing is imperforate excepting solely for its inlet means and its discharge means, the axis of the inlet means being related to the median plane of each rotor element as it attains a position substantially midway between the inlet means and the discharge means in the region of greatest influence at an angle other than normal. In the instance of the embodiment shown in Figs. 1, 2, and 3, the median plane of each rotor element is substantially normal to the plane of the rotor and the axis of the inlet means, at an angle other than parallel to the rotor plane. In the instance of the embodiment shown in Figs. 4, 5 and 6, the median plane of each rotor element is at an angle other than normal to the rotor plane and the axis of the inlet means is substantially parallel to the rotor plane.

The above relationship of non-normality of angularity of the axis of the inlet and median plane of the trailing faces of the rotor elements, effective when attaining and passing through the region of greatest influence, increases the efficiency of operation and the rate of rotor speed, attained, as based on observations derived from tests, by reduced eddy and other counteracting air flow.

Such increased efficiency and rate of speed of rotor and rotor elements are attained with decreased whistling or other noise effect, the optimum result being had by the additional provisions of the above stated cut-away part of the inlet means and the cut-away apices of the rotor element.

Whereas, I have described my invention by reference to specific forms thereof, it will be understood that many changes and modifications may be made without departing from the spirit of the invention.

I claim.

1. An air motor comprising a casing having an inner substantially cylindrical contour, a rotor within the casing, the rotor comprising a plurality of substantially uniformly circumferentially distributed elements extending radially outward from the periphery of the rotor, the rotor elements having their peripheral edges spaced substantially uniformly for all rotated positions relative to the substantially cylindrical inner face of the casing, said rotor elements being arranged singly in seriatim and substantially in alignment with one another and parallel to one another, the casing being provided with inlet means and also with discharge means, the cross-sectional area of the discharge means being substantially equal to that of the inlet means, said inlet means having a cut-away portion, the casing being imperforate excepting solely for the inlet means and the discharge means, the discharge means being spaced from the inlet means less than one hundred and eighty angular degrees and greater than that of immediate rotor elements, and means for reducing whistling and other air noises, said noise reducing means comprising means for mounting the inlet means to be disposed to have its axis located at an angle less than normal to the median plane of a rotor element when assuming a position substantially centrally between the inlet means and the discharge means in the field of greatest influence.

2. An air motor comprising a casing having an inner substantially cylindrical contour, a rotor within the casing, the rotor comprising a plurality of substantially uniformly circumferentially distributed elements, extending radially outward from the periphery of the rotor, the rotor elements having their peripheral edges spaced substantially uniformly for all rotated positions relative to the substantially cylindrical inner face of the casing, said rotor elements being arranged singly in seriatim and substantially in alignment with one another and parallel to one another, the casing being provided with inlet means and also with discharge means, the cross-sectional area of the discharge means being substantially equal to that of the inlet means, said inlet means having a tapered portion discharging within the casing, a portion of said tapered portion being cut-away, the casing being imperforate excepting solely for the inlet means and the discharge means, the discharge means being spaced from the inlet means less than one hundred and eighty angular degrees and greater than that of immediate rotor elements, and means for reducing whistling and other air noises, said noise reducing means comprising means for mounting the inlet means to be disposed to have its axis located at an angle less than normal to the median plane of a rotor element when assuming a position substantially centrally between the inlet means and the discharge means in the field of greatest influence, each rotor element having its median plane disposed normal to the plane of the rotor.

3. An air motor comprising a casing having an inner substantially cylindrical contour, a rotor within the casing, the rotor comprising a plurality of substantially uniformly circumferentially distributed elements extending radially outward from the periphery of the rotor, the rotor elements having their peripheral edges spaced substantially uniformly for all rotated positions relative to the substantially cylindrical inner face of the casing, said rotor elements being arranged singly in seriatim and substantially in alignment with one another and parallel to one another, the casing being provided with inlet means and also with discharge means, the cross-sectional area of the discharge means being substantially equal to that of the inlet means, said inlet means having a tapered portion discharging within the casing, said tapered portion being cut-away at a side opposite the path of travel of the rotor elements, the casing being imperforate excepting solely for the inlet means and the discharge means, the discharge means being spaced from the inlet means less than one hundred and eighty angular degrees and greater than that of immediate rotor elements, and means for reducing whistling and other air noises, said noise reducing means comprising means for mounting the inlet means to be disposed to position its axis substantially parallel to the plane of the rotor, each rotor element having its median plane disposed at an angle other than normal to the plane of the rotor.

4. An air motor comprising a casing having an inner substantially cylindrical contour, a rotor within the casing, the rotor comprising a plurality of substantially uniformly circumferentially distributed elements extending radially outward from the periphery of the rotor, each rotor element having a convex leading face and a concave trailing face, the rotor elements having their peripheral edges spaced substantially uniformly for all rotated positions relative to the substantially cylindrical inner face of the casing, said rotor elements being arranged singly in seriatim and substantially in alignment with one another and parallel to one another, the casing being provided with inlet means and also with discharge means, the cross-sectional area of the discharge means being substantially equal to that of the inlet means, said inlet means having a tapered portion discharging within the casing, said tapered portion being cut-away at a side opposite the path of travel of the rotor elements, the casing being imperforate excepting solely for the inlet means and the discharge means, the discharge means being spaced from the inlet means less than one hundred and eighty angular degrees and greater than that of immediate rotor elements, and means for reducing whistling and other air noises, said noise reducing means comprising means for mounting the inlet means to be disposed to have its axis located at an angle less than normal to the median plane of a rotor element when assuming a position substantially central between the inlet means and the discharge means in the field of greatest influence.

EDW. S. CORNELL, Jr.